United States Patent [19]
Champ et al.

[11] Patent Number: 5,232,207
[45] Date of Patent: Aug. 3, 1993

[54] SPRING CONNECTOR ACCUMULATOR

[75] Inventors: Larry B. Champ, Cairo; Martin J. Wortmann, Moberly, both of Mo.

[73] Assignee: Orscheln Co., Moberly, Mo.

[21] Appl. No.: 971,198

[22] Filed: Nov. 4, 1992

[51] Int. Cl.5 .................... F16F 1/00; F16F 9/00
[52] U.S. Cl. .................... 267/70; 74/501.5 R; 188/2 D; 267/166; 267/170; 267/72
[58] Field of Search .......... 267/70, 71, 72, 73, 267/74, 69, 166, 169, 170, 173, 177, 179; 74/501.5 R, 502.4, 470; 188/2 D, 196 R; 192/111 A

[56] References Cited

U.S. PATENT DOCUMENTS

| | | | |
|---|---|---|---|
| 212,840 | 3/1879 | Cuthbert | 267/72 |
| 217,020 | 7/1879 | Moreland | 267/72 |
| 224,210 | 2/1880 | Miller | 267/72 |
| 383,183 | 5/1888 | Leavell et al. | 278/89 |
| 529,649 | 11/1894 | Herman | 267/72 |
| 889,984 | 6/1908 | Streeter | 267/72 |
| 2,117,701 | 5/1938 | Burnett | 267/72 |
| 2,417,504 | 3/1947 | Knaggs et al. | 74/501.5 R |
| 2,744,420 | 5/1956 | Pigford | 74/501.5 R |
| 4,223,564 | 9/1980 | Fawcett | 74/502.4 |
| 4,378,713 | 4/1983 | Haskell et al. | 74/501.5 R |
| 4,385,754 | 5/1983 | Waite | 267/71 |
| 4,838,109 | 6/1989 | Stewart | 74/501.5 R |
| 4,930,605 | 6/1990 | Boyer et al. | 188/2 D |
| 5,086,662 | 2/1992 | Tayon et al. | 74/501.5 R |

FOREIGN PATENT DOCUMENTS

| | | | |
|---|---|---|---|
| 234864 | 9/1987 | European Pat. Off. | 74/501.5 |
| 267685 | 5/1988 | European Pat. Off. | |
| 1382678 | 3/1988 | U.S.S.R. | 74/501.5 |

Primary Examiner—Douglas C. Butler
Attorney, Agent, or Firm—Laubscher & Laubscher

[57] ABSTRACT

A spring connector accumulator includes a helical compression spring, and a pair of connector body members that extend in opposite directions through the spring for maintaining the same in a predetermined preloaded partially compressed condition. The body members include first end portions adapted for connection with cable end fittings, respectively, intermediate portions that extend through the spring, and second end portions that abut opposite ends of the spring. In a first embodiment, the body members include main abutment surfaces that are snapped into abutting engagement to maintain the spring in a preloaded partially compressed condition. In a second embodiment, the spring is partially compressed to the desired preloaded condition between a pair of opposed spaced hook portions on each of the body members, respectively.

18 Claims, 3 Drawing Sheets

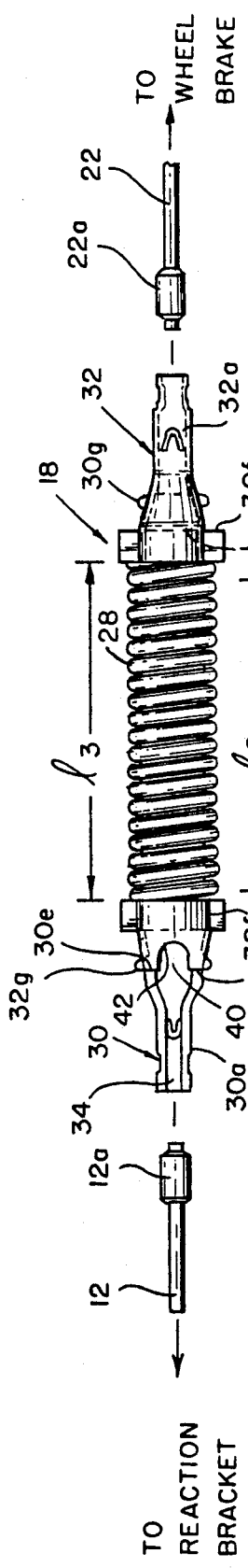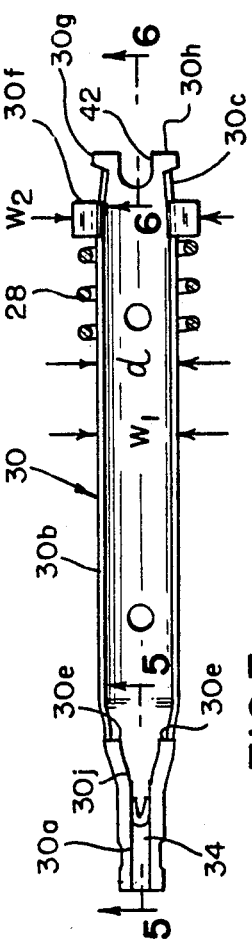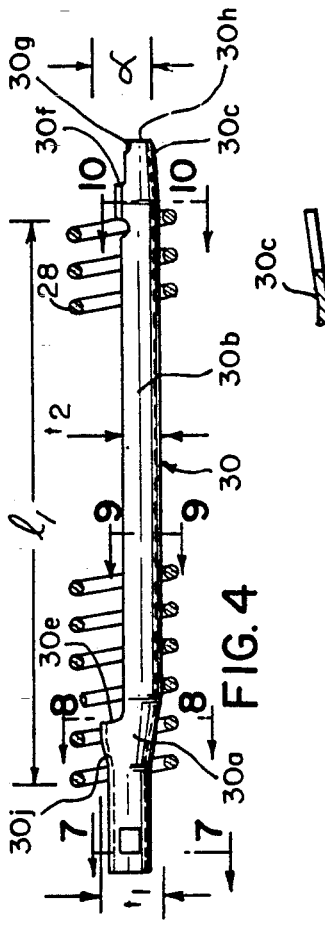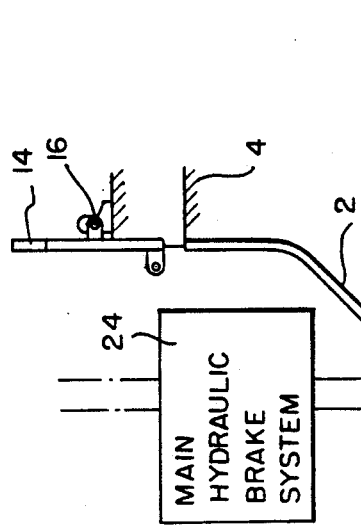

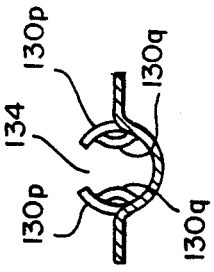
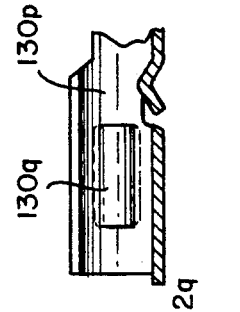
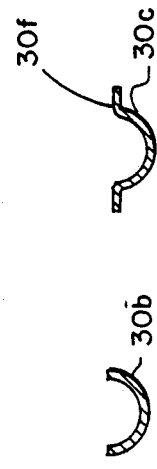
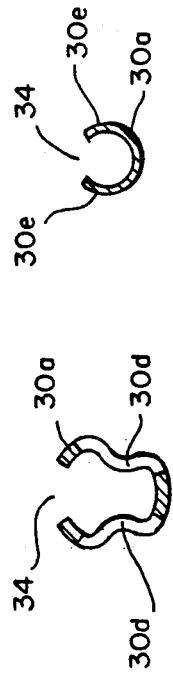
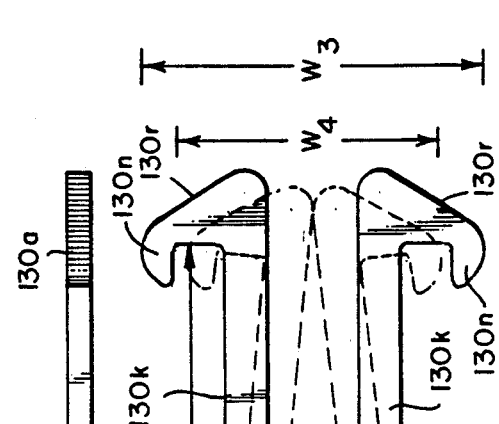
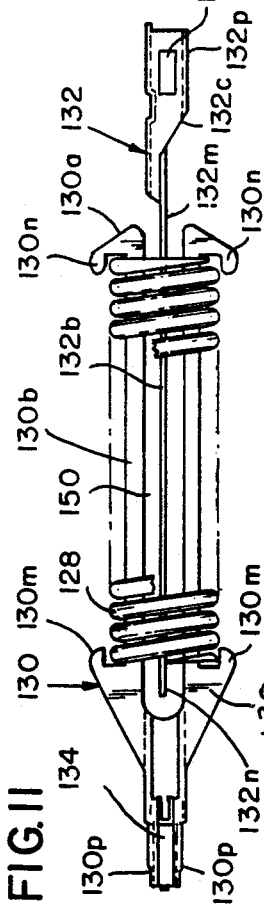
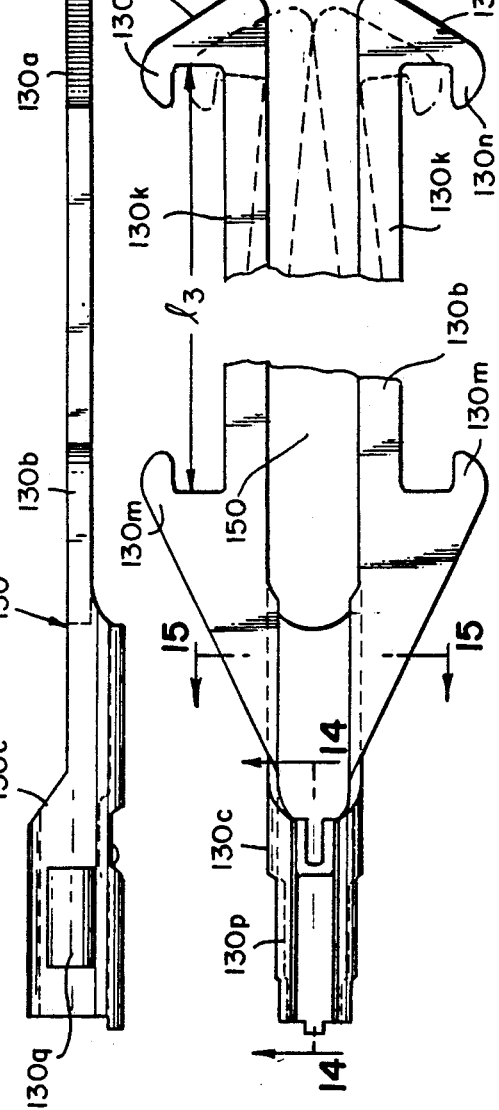

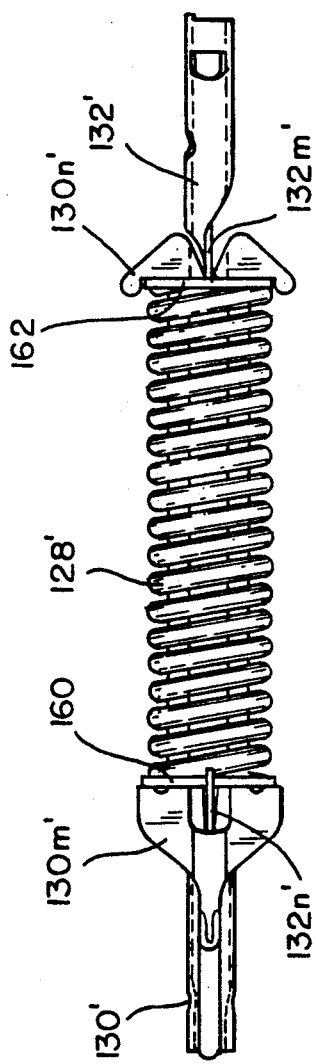
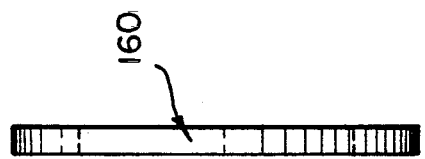
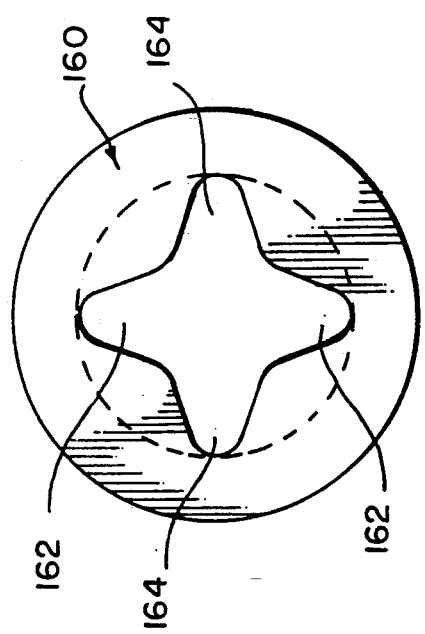
FIG. 16
FIG. 18
FIG. 17

SPRING CONNECTOR ACCUMULATOR

STATEMENT OF THE INVENTION

A spring connector accumulator is provided having a helical compression spring, and a pair of identical stamped metal connector body members adapted for insertion within opposite ends of the spring for normally maintaining the spring in a preloaded partially compressed condition.

BRIEF DESCRIPTION OF THE PRIOR ART

Tension compensating devices for maintaining cables or wires under a desired tension force are well known in the prior art, as evidenced, for example, by the patents to Herman U.S. Pat. No. 529,649, Streeter U.S. Pat. No. 889,984, Burnett U.S. Pat. No. 2,117,701 and Cuthbert U.S. Pat. No. 212,840. It is conventional in such tension compensating devices to provide a pair of connector members that extend in opposite directions through a helical compression spring. The connector members cooperate with opposite ends of the spring and are slidably displaceable relative to each other longitudinally of the spring, thereby to vary the state of compression thereof, and, consequently, the tension of the cables or wires connected thereto.

The known connector components are rather costly to manufacture and difficult to assemble with the spring, particularly when these components are formed from solid metal rods or the like. Also the weight of such components is an important consideration, particularly when the components are to be used in a motor vehicle.

Finally, it is difficult—if not impossible—in the known tension compensating devices to pre-load the compression spring by a predetermined amount.

The present invention was developed to avoid the above and other drawbacks of the known cable tensioning devices, and to provide an improved preloaded spring connector accumulator consisting solely of only a helical compression spring, and a pair of identical connector members formed by stamping from sheet metal.

SUMMARY OF THE INVENTION

Accordingly, a primary object of the present invention is to provide a spring connector accumulator including a helical compression spring, and a pair of connector members stamped from sheet metal and extending in opposite directions through the spring. Preferably, the connector members are operable to normally maintain the spring in a predetermined preloaded partially compressed condition.

According to a first embodiment of the invention, the connectors have a semi-circular cross-sectional configuration, the connector members being rotated about their longitudinal axes through 180° relative to each other to define a generally tubular configuration of high torsional and lateral strength. At their remote ends, the connector members engage the ends of the spring, respectively, the connector members being connected together by cooperating snap-fit abutment means so arranged as to cause the spring to be normally in a preloaded partially compressed condition.

According to a second modification, the connector body members are generally planar and are rotated about their longitudinal axes through and angle of 90° relative to each other, each of said members having opposed spaced hook portions that engage opposite ends of the spring to maintain the same in a predetermined partially-compressed condition. In this embodiment, in order to permit longitudinal insertion through the spring, the connector members each contain at one end a longitudinal slot of a width permitting lateral compression of the leg portions defined thereby to such an extent that the distance between the outermost edges of the hook portions at one end of the connector member is less than the spring internal diameter.

The spring connector accumulator of the present invention is particularly suitable for use as an energy storing means in a parking brake system.

BRIEF DESCRIPTION OF THE DRAWINGS

Other objects and advantages of the invention will become apparent from a study of the following specification when viewed in the light of the accompanying drawing, in which:

FIG. 1 is a schematic representation of a parking brake system of the reaction conduit type including the spring accumulator of the present invention;

FIG. 2 is a plan view of the assembled spring connector accumulator of the present invention;

FIGS. 3 and 4 are top plan and side elevational views, respectively, of one of the connector body members of FIG. 2;

FIGS. 5 and 6 are sectional views taken along lines 5—5 and 6—6 of FIG. 3, respectively;

FIGS. 7, 8, 9 and 10 are sectional views taken along lines 7—7, 8—8, 9—9 and 10—10, respectively, of FIG. 4;

FIG. 11 is a plan view of a second embodiment of the spring connector accumulator of the present invention;

FIGS. 12 and 13 are side elevation and top plan views, respectively, of one of the connector body members of the assembly of FIG. 11;

FIGS. 14 and 15 are sectional views taken along lines 14—14 and 15—15, respectively, of FIG. 13;

FIG. 16 is a top plan view of a modification of the embodiment of FIG. 11; and

FIGS. 17 and 18 are side elevation and edge views, respectively, of one of the washer means of the apparatus of FIG. 16.

DETAILED DESCRIPTION

Referring first more particularly to FIG. 1, the known reaction type parking brake system is generally of the type shown in the Stewart U.S. Pat. No. 4,838,109 and includes a reaction conduit 2 that is connected at one end with a fixed support 4, the other end of the conduit being connected with an opening contained in the reaction bracket 6. The reaction bracket is connected with a first wheel brake 8 via a first inner strand cable member 10. Second cable means 12 including a second inner strand cable member are connected at one end with an operating lever 14 that is pivotally connected with the fixed support for movement about fixed pivot axis 16. In accordance with a characterizing feature of the present invention, second cable means extends through the reaction conduit 2 and through the opening in reaction bracket 6 for connection with one end of spring connector accumulator 18 the other end of which is connected with the other wheel brake 20 via inner strand cable portion 22. As is known in the art, the reaction conductor 2 normally has a slightly bent configuration, so that when lever 14 is pivoted to tension inner strand cable member 12 and thereby operate wheel brake 20 via inner strand cable member 22, the reaction conduit is straightened to some extent, thereby to displace reaction bracket 6 to operate wheel brake via inner strand cable member 10. As will be explained in greater detail below, during this operation of the parking brake system, the spring connector accumulator 18 serves to store a certain amount of the energy from the main hydraulic brake system 24 and to return the same to the parking brake system.

Referring now to FIG. 2, the spring connector accumulator 18 includes a helical compression spring 28, and a pair of identical connector body members 30 and 32 formed by stamping from a sheet of spring steel. Referring to FIG. 3, the connector body member 30 is generally concave throughout its length and includes a first end portion 30a, an intermediate portion 30b, and a second end portion 30c. As shown in FIGS. 7 and 8, the side walls of the first end portion 30a are provided with a longitudinal gap 34 for receiving the end connector 12a of cable means 12 during the connection thereof to the connector body member. The side walls of the end portion 30a are crimped inwardly together as shown in FIG. 7 to define a pair of cable terminal abutment surfaces 30d against which the end of the cable terminal connector 12a abuts. The right hand end portions of the raised side walls define a pair of first main abutment surfaces 30e that will be described in greater detail below.

As shown in FIG. 9, the intermediate portion 30b of the connector body member has a semi-circular configuration, as does the second end portion 30c. As shown in FIGS. 2 and 10, the second end portion 30c is provided with laterally outwardly extending wing portions 30f against which the corresponding end of the helical spring 28 abuts, as best shown in FIG. 3. The second end portion 30c terminates at its extremity in a pair of laterally outwardly extending structure reinforcing wings 30g, thereby to define second main abutting end surfaces 30h that abut against corresponding surfaces of the companion connector body member when the components are in the assembled condition shown in FIG. 2.

When in its normal non-compressed condition, the compression spring 28 has an initial maximum length $l_1$, as shown in FIG. 4. If the compression spring were to be fully compressed with successive turns in contiguous relation, the compression spring would have the minimum length $l_2$ shown in FIG. 2. In accordance with the present invention, the compression spring is preloaded to have a partially compressed length $l_3$ which is between the fully compressed and non-compressed lengths $l_2$ and $l_1$, respectively.

It is important to note that the width $w_1$ of the intermediate portion shown in FIG. 3 is less than the internal diameter d of the spring 28. Similarly, the thickness $t_1$ of the first end 30a of the connector body member is less than the internal diameter d of the spring, as shown in FIG. 4. The thickness $t_2$ of the intermediate portion 30b of the connector body member is slightly less than one half of the spring internal diameter d.

To assemble the components to the assembled condition illustrated in FIG. 2, the first ends 30a and 32a of the connector body members 30 and 32 are introduced through opposite ends of the helical spring 28, which spring initially has the non-compressed maximum length $l_1$. During this initial insertion, the connector members are rotated about their longitudinal axes through an angle of 180° relative to each other. The wing portions 30f and 32f are brought into engagement with opposite ends of the spring 28, whereupon the connector body members are further displaced longitudinally together to effect initial compression of the spring 28. During the final displacement of the connector members toward the assembled condition of FIG. 2, the wing portion 32f of the connector member 32 rides upwardly upon the inclined surfaces 30j of opposite sides of the opening 34 contained in the first end 30a of connector member 30. Similarly, at the other end, the wing portion 30f of the connector member 30 rides upwardly upon corresponding upwardly inclined surfaces on the second end of the second connector member 32. The helical compression spring continues to be compressed until it has a length slightly less than the intermediate length $l_3$, whereupon the main abutment surfaces 32h at the second end of the second connector member snap behind the main abutment surfaces 30e at the end of the upwardly inclined ramp 30j. At the other end, the main abutment surfaces 30h at the other end of the first connector member snap behind corresponding abutment surfaces 32e on the second connector member. Upon release of the longitudinal forces applied to the connector members, spring 28 expands to its predetermined preloaded partially-compressed length $l_3$, as shown in FIG. 2. The cable terminal 12a is then introduced in the opening 40 defined between the first end of the first connector and the slot 42 defined in the adjacent end of the second connector member, whereupon cable 12 is displaced to the left to cause the cable terminal member 12a to engage the abutment walls 30d (FIG. 7). Similarly, at the other end, the cable terminal 22a of the second cable 22 is be connected with the first end 32a of the second connector member 32, thereby to connect the assembly to right wheel brake 20.

In operation, assume that the operator wishes to park the vehicle on a hill. The main hydraulic brakes are operated to apply the vehicle brakes, and the parking brake lever 14 is operated to tension the reaction parking brake system, thereby to further compress the helical spring 28. Upon release of the main hydraulic brakes, the energy stored in helical spring 18 takes up any play that occurs and to increase the parking brake pressure to compensate for any loss in the main hydraulic system braking pressure (particularly, as might occur when the parking brake and main brake forces are applied to different locations on the brake shoes).

It should be noted that when the components are in the assembled condition of FIG. 2, longitudinal edge surfaces of the central portions 30b and 32b of the connectors are in engagement and the semi-circular intermediate portions define a generally tubular configuration, thereby to support the central portion of the spring.

Referring now to the embodiment of FIG. 11, a pair of connector body members 130 and 132 are formed by stamping from a metal sheet, and include first end portions 130a and 132a, intermediate portions 130b and 132b, and second end portions 130c and 132c, respectively. As shown in FIG. 11, the connectors 130 and 132, which are of identical general planar construction, are rotated about their longitudinal axes through an angle of 90° relative to each other. The first end portion 130a and intermediate portion 130b of connector member 130 contain a longitudinally extending slot 150, thereby to define a pair of resilient leg portions 130k. As shown in FIGS. 11 and 13, the leg portions 130k support a pair of opposed hook portions 130m and 130n that are spaced by the distance $l_3$ (corresponding to the spring preload distance $l_3$ in the embodiment of FIG. 2). At its second end, the connector includes a pair of opposed spaced side walls 130p that are separated at their free edges by the gap 134. The walls contain inwardly bent deformations 130q (FIG. 15) for supporting the terminal end of a cable connected with the end portion 130c.

Referring to FIG. 13, the maximum width $w_3$ of the hook portions 130n is reduced to a compressed width dimension $w_4$ that is less than the spring internal diameter d when the leg portions 130k are laterally displaced together, thereby to permit insertion of the first end 130a of the connector member within the helical spring 128. Similarly, the leg portions of the other connector member 132 are laterally compressed to permit insertion thereof within the other end of the helical spring 128. The inclined ramp surfaces 130r on the hook portions 130n assist in the introduction of the laterally compressed leg portions within the spring. When the connector members have been completely inserted within the spring, the spring is compressed until the ends of the spring snap over the associated hook portion 130n and 132n, respectively, whereupon the leg members 130k resiliently separate and the compression spring expands to its preloaded partially compressed condition of FIG. 11. Thus, in this embodiment, the spring is preloaded between opposed hook portions arranged on the same connector member.

In the modification of FIGS. 16-18, a pair of washers 160 and 162 are provided between the ends of the helical spring 128' and the associated hook portions 130m' and 130n', and 132m' and 132n', respectively. As shown in FIG. 17, the washer 160 contains two pairs of diametrically arranged grooves 162 and 164 that receive the leg portions of the bifurcated connector members, respectively, thereby to prevent twisting of the connector members by the preloaded partially compressed helical spring 128'.

The invention offers the advantages that the connector body members consist of two low cost stampings, and that the spring is preloaded without the use of any additional parts. The design affords economical straight line assembly of the parts with all motion being in a straight line, thus simplifying automatic assembly and reduced manufacturing cost. The components snap together, thereby assuring that the device is always ready for installation upon receipt by a customer. The connector components are manufactured in a single stamping operation and thus are cheaper to produce than the forged, cast or machined components of the prior art.

While in accordance with the provisions of the Patent Statutes we have illustrated and described the preferred forms and embodiments of the invention now known to us, and it will be apparent to those skilled in the art that various changes may be made without deviating from the inventive concepts set forth above.

What is claimed is:

1. A spring connector accumulator for connecting together a pair of tension members, comprising:
    (a) a helical compression spring including a plurality of spring turns having a given internal diameter (d), said spring normally having a non-compressed fully expanded condition in which said spring turns are spaced and said spring has a maximum length ($l_1$), said spring being longitudinally compressible toward a fully compressed condition in which successive ones of said spring turns are contiguous and said spring has a minimum length ($l_2$); and
    (b) a pair of connector body members each having a length greater than that of said spring, said body members having first and second end portions, and an intermediate portion between said end portions, said first end and said intermediate portions having effective width dimensions ($w_1$) that are less than said spring internal diameter, and said second end portion having a width dimension ($w_2$) that is greater than said spring internal diameter, said body members being parallel and reversely arranged with their first ends inserted through opposite ends of said spring to positions at which said body member second ends are adjacent the associated ends of said spring, respectively;
    (c) said connector body members being operable to longitudinally compress said spring to a predetermined preloaded partially compressed condition having an intermediate length ($l_3$) that is between said maximum and minimum spring lengths.

2. Apparatus as defined in claim 1, wherein said connector body members are stamped from sheet metal.

3. Apparatus as defined in claim 2, wherein said connector body members are identical.

4. Apparatus as defined in claim 2, and further including means connecting together said pair of body members at such a relative longitudinal position as to cause the second portions thereof to be spaced by a distance equal to said intermediate length ($l_3$).

5. Apparatus as defined in claim 4, wherein said connecting means comprises for each body member first and second main abutment shoulders adjacent said first and second body member ends, respectively, said first main abutment shoulder of one member being in abutting engagement with the second main abutment shoulder of the other member when said spring is in said partially compressed condition.

6. Apparatus as defined in claim 5, wherein said second main abutment shoulder comprises the second end extremity of said body member, said first and second main abutment shoulders of one of said members, being snap-fit into engagement with the second and first main abutment surfaces, respectively, of the other of said members when said members are longitudinally displaced together to compress said spring to said partially compressed condition.

7. Apparatus as defined in claim 6, wherein said intermediate portion of each of said body members has a generally semi-circular cross-sectional configuration having a maximum diameter that is no greater than the internal diameter of said spring.

8. Apparatus as defined in claim 7, wherein said second end portion of each body member includes a first pair of laterally outwardly extending wing portions spaced inwardly from the second end extremity, said wing portions of said body members being in abutting engagement with opposite ends of said spring, respectively.

9. Apparatus as defined in claim 8, wherein said second abutment shoulders for each body member comprise a pair of laterally outwardly extending abutment shoulders adjacent the extremity of said second body end.

10. Apparatus as define din claim 2, wherein each of said body members includes first and second abutment means between which said spring is arranged, said abutment means being longitudinally spaced by a distance equal to said spring intermediate length ($l_3$).

11. Apparatus as defined in claim 10, wherein said abutment means comprise generally concave hook portions having concavities which face each other.

12. Apparatus as defined in claim 11, wherein one end portion and said intermediate portion of each of said body members are generally flat and bifurcated to define a pair of leg portions separated by a longitudinal slot, said slot having a width such as to permit lateral compression of said leg portions toward each other to such an extent that the distance between the lateral extremities of said hook portions is less than the internal diameter of said spring, thereby to permit insertion of said one end completely through said spring when said spring is in the fully compressed condition, whereby upon lateral expansion of said leg portions, said spring will be retained in the preloaded partially compressed condition between said hook portions.

13. Apparatus as defined in claim 12, wherein said connector members are rotated about their longitudinal axes through 90° relative to each other.

14. Apparatus as defined in claim 13, and further including a pair of washer members arranged between the ends of said spring and the associated hook portions of said body members, respectively.

15. Apparatus as defined in claim 14, wherein each of said washer members contains a generally X-shaped central opening defining two pairs of diametrically opposed channels receiving said leg portions of said bifurcated body members, respectively, thereby to prevent rotation of said body members relative to each other.

16. Apparatus as defined in claim 2, and further including:
(d) a reaction brake system having a reaction bracket containing an opening, a normally bent reaction conduit adapted for connection at one end with a fixed support, the other end of said reaction bracket being connected with said reaction bracket opening, a parking brake lever movably connected with the fixed support, first inner strand cable means for connecting said reaction bracket with a first wheel brake, and second inner strand cable means for connecting said lever with a second wheel brake, said second cable means including a first inner strand portion connected at one end with said lever and extending through said conduit and said reaction bracket opening, said first inner strand portion being connected at its other end with said one end of one of said connector body members, and a second inner strand portion for connecting said one end of the other of said connector body members with the other wheel brake.

17. A spring connector accumulator for connecting together a pair of tension members, comprising:
(a) a helical compression spring including a plurality of spring turns having a given internal diameter (d), said spring normally having a non-compressed fully expanded condition in which said spring turns are spaced and said spring has a maximum length ($l_1$), said spring being longitudinally compressible toward a fully compressed condition in which successive ones of said spring turns are contiguous and said spring has a minimum length ($l_2$); and
(b) a pair of connector body members each having a length greater than that of said spring, said body members having first and second end portions, and an intermediate portion between said end portions, said first end and said intermediate portions having effective width dimensions ($w_1$) that are less than said spring internal diameter, and said second end portion having a width dimension ($w_2$) that is greater than said spring internal diameter, said body members being parallel and reversely arranged with their first ends inserted through opposite ends of said spring to positions at which said body member second ends are adjacent the associated ends of said spring, respectively;
(c) said connector body members each being formed of sheet metal with said intermediate portion having a semi-circular cross-sectional configuration, said connector body members being rotated about their longitudinal axes through an angle of 180° relative to each other, said second end of each connector body member including wing portions that extend laterally outwardly from both sides of said member with the distance between extremities of said wing portions being greater than the spring diameter; and
(d) means connecting said body members against relative longitudinal displacement in directions moving said wing portions away from said spring ends, respectively.

18. A spring connector accumulator for connecting together a pair of tension members, comprising:
(a) a helical compression spring including a plurality of spring turns having a given internal diameter (d), said spring normally having a non-compressed fully expanded condition in which said spring turns are spaced and said spring has a maximum length ($l_1$), said spring being longitudinally compressible toward a fully compressed condition in which successive ones of said spring turns are contiguous and said spring has a minimum length ($l_2$); and
(b) a pair of connector body members each having a length greater than that of said spring, said body members having first and second end portions, and an intermediate portion between said end portions, said first end and said intermediate portions having effective width dimensions ($w_1$) that are less than said spring internal diameter, and said second end portion having a width dimension ($w_2$) that is greater than said spring internal diameter, said body members being parallel and reversely arranged with their first ends inserted through opposite ends of said spring to positions at which said body member second ends are adjacent the associated ends of said spring, respectively;
(c) said connector body members having generally planar first and intermediate portions and being rotated about their longitudinal axes through an angle of 90° relative to each other, said first end and intermediate portions of each of said body members containing a longitudinally extending slot, thereby to define a pair of resilient leg portions, said leg portions carrying on their remote surfaces a pair of longitudinally spaced opposed hook portions between which said spring is arranged, said slot having such a width as to permit lateral displacement of said wing portions together so as to permit introduction of the connector body member one end and the hook portions associated therewith into the associated end of said spring.

* * * * *